United States Patent [19]
Schorman

[11] Patent Number: 5,745,854
[45] Date of Patent: Apr. 28, 1998

[54] METHOD AND APPARATUS FOR DYNAMICALLY ADJUSTING A MAXIMUM NUMBER OF USERS ON A CHANNEL UTILIZING A VOICE ACTIVITY FACTOR

[75] Inventor: Eric Reed Schorman, Bedford, Tex.

[73] Assignee: Motorola, Inc., Schaumburg, Ill.

[21] Appl. No.: 403,550

[22] Filed: Mar. 14, 1995

Related U.S. Application Data

[63] Continuation of Ser. No. 71,091, Jun. 4, 1993, abandoned.

[51] Int. Cl.⁶ .................. H04B 7/00; H04J 3/17
[52] U.S. Cl. ............... 455/452; 455/509; 370/348; 370/435
[58] Field of Search .............. 340/825.03; 370/79, 370/329, 336, 337, 435, 433, 254, 468, 347, 348; 379/59; 455/422, 455, 452, 509, 67.1

[56] References Cited

U.S. PATENT DOCUMENTS

| | | | |
|---|---|---|---|
| 4,048,447 | 9/1977 | Maruta | 370/81 |
| 4,100,377 | 7/1978 | Flanagan | 370/81 |
| 4,229,622 | 10/1980 | Cochrane | 370/81 |
| 4,627,049 | 12/1986 | Black | 370/435 |
| 4,754,453 | 6/1988 | Eizenhoffer | 370/95.1 |
| 4,763,322 | 8/1988 | Eizenhoffer | 370/95.1 |
| 4,799,252 | 1/1989 | Eizenhoffer et al. | 379/59 |
| 4,831,373 | 5/1989 | Hess | 340/825.03 |
| 4,949,395 | 8/1990 | Rydbeck | 455/33 |
| 5,134,709 | 7/1992 | Bi et al. | 455/33.1 |
| 5,231,649 | 7/1993 | Duncanson | 375/260 |
| 5,265,091 | 11/1993 | Van Landegem | 370/60 |
| 5,272,697 | 12/1993 | Fraser et al. | 370/61 |
| 5,299,198 | 3/1994 | Kay et al. | 370/95.3 |
| 5,327,467 | 7/1994 | De Gaudenzi et al. | 375/356 |
| 5,373,502 | 12/1994 | Turban | 370/79 |
| 5,535,207 | 7/1996 | Dupont | 455/452 |

*Primary Examiner*—Edward F. Urban
*Attorney, Agent, or Firm*—Bruce Terry

[57] ABSTRACT

In a resource limited communication system having at least one physical channel shared by a plurality of time divided users, a method is provided of dynamically adjusting a maximum number of users allowed access to the at least one physical channel. The method includes the steps of calculating a voice activity factor for each user of the plurality of time divided users and adjusting the maximum number of users based upon the calculated voice activity factors. An apparatus is provided for implementing the described method.

18 Claims, 2 Drawing Sheets

METHOD AND APPARATUS FOR DYNAMICALLY ADJUSTING A MAXIMUM NUMBER OF USERS ON A CHANNEL UTILIZING A VOICE ACTIVITY FACTOR

This is a continuation of application Ser. No. 08/071,091, filed Jun. 4, 1993 and now abandoned.

FIELD OF THE INVENTION

The field of the invention relates to communication systems.

BACKGROUND OF THE INVENTION

Time assigned speech interpolation (TASI) and digital speech interpolation (DSI) techniques are often used within public switched telephone networks (PSTNs) where speech signals must be exchanged between two or more points (switching centers) over a limited number of grouped physical channels (e.g., over T1 lines). Where high capacity T1 span lines are used the number of lines needed is determined by dividing an estimate of the total number of traffic channels needed at a switching center by the number (N) traffic channel provided per T1 line.

In some PSTNs each traffic channel of the N traffic channels per T1 line is allocated to a call for the duration of the call. While such a technique may produce reliable telephone service of good quality, such technique is wasteful. The technique is wasteful because normal speech is often punctuated by pauses between sentences or between words within a sentence. Such pauses causes the traffic channel to remain idle during the pause instead of transmitting voice information.

To reduce the waste associated with idle traffic channels, a TASI or DSI (TASI/DSI) system limits allocation of traffic channels to periods between pauses (where information is available for transmission). Where a pause occurs during speech, the channel is released for use by another user. When speech resumes the next available channel is allocated in support of the conversation.

Key to the successful operation of a TASI/DSI system is determination, during set-up of the system, of an accurate estimate of an average voice activity factor (VAF) of a set of grouped physical channels. A VAF is an estimate of the ratio of speech time to the sum of speech plus pauses. VAFs are typically estimated by system designers because of the difficulty of measuring individual voice channels and of obtaining an average of a channel group.

The VAF is used by the TASI/DSI system as a measure of the additional users that may be granted access over the number of physical channels available (e.g., if the VAF= 50% then 2 users may be granted access for each physical channel present). Where a VAF is estimated high, communication resources are again wasted because traffic channels again remain idle. Where the VAF is estimated low, voice information may be lost because too many users may be allowed access to the communication system. Where too many users are allowed access to the system, a traffic channel may not be available following a pause, resulting in speech loss (clipping). The speech clipped, in such a case, is that fraction (cutout fraction) of the speech presented to the system before a traffic channel becomes available.

Speech has been determined by Weinstein (*Fractional Speech Loss and Talker Activity Model for TASI and for Packet-Switched Speech*, C. J. Weinstein, IEEE Transactions, August 1978) to be acceptable if the cutout fraction does not exceed 0.5%. The cutout fraction, in accordance with Weinstein, can be determined by solving the equation:

$$\phi = \frac{1}{np} \sum_{k=c+1}^{n} (k-c) \binom{n}{k} p^k (1-p)^{n-k}$$

where $\phi$ is the cutout fraction, n is the number of users, c is the number of traffic channels, and p is the estimated VAF.

While TASI/DSI systems often work well, the success of such systems depends on the accurate estimate of the VAF. Where the VAF is incorrectly estimated, or the VAF changes, then the system must be modified to correct for inefficient use or poor speech quality. In addition, where the character of the information on the traffic channels changes during certain periods of the day (e.g., an increase in facsimile messages during the afternoon) the quality of performance of the TASI/DSI system may suffer. Because of the importance of reliable communication a need exists for a method of applying TASI/DSI to cellular communication systems and of adapting TASI/DSI operating characteristics to the changing information content of the traffic channel.

SUMMARY OF THE INVENTION

In a resource limited communication system having at least one physical channel shared by a plurality of time divided users, a method is provided of dynamically adjusting a maximum number of users allowed access to the at least one physical channel. The method includes the steps of calculating a voice activity factor for each user of the plurality of time divided users and adjusting the maximum number of users based upon the calculated voice activity factors. An apparatus is provided for implementing the described method.

DETAILED DESCRIPTION OF THE PREFERRED EMBODIMENT

The solution to the problem of clipping and inefficiency within a resource limited TASI/DSI cellular communication system under a varying VAF lies in determining an average VAF for users within the system over a time interval based upon vocoder activity at a cellular base site and adjusting a maximum number of users based upon the determined average VAF. Such adjustment allows for maximum voice quality and efficiency by dynamically adjusting the maximum number of users within the system to the VAF of the users of the system.

Figure 1:
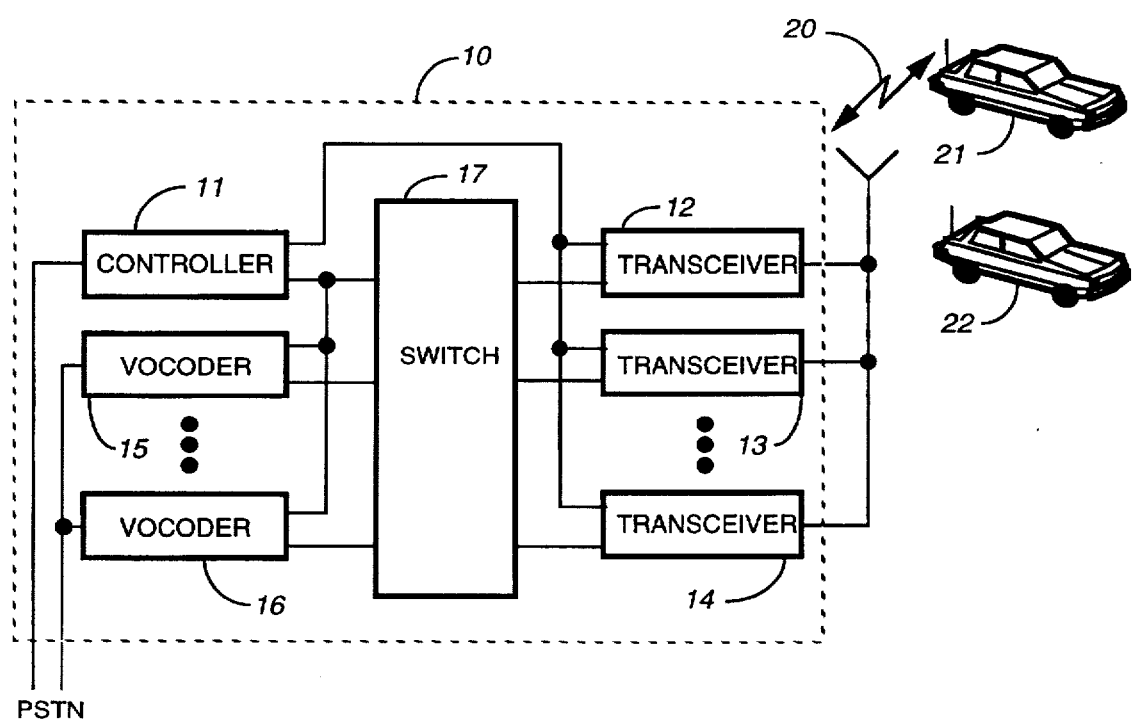
FIG. 1 is a block diagram of a cellular base site in accordance with one embodiment of the invention.

FIG. 1 is a block diagram of a base site, generally, 10 in accordance with one embodiment of the invention. Included within the base site 10 is a number of vocoders 15–16 and a lesser number of transceivers 12–14 capable of being interconnected with vocoders 15–16 through a switch 17. Transceivers 12–14 provide a primary means for interfacing with subscribers units 21–22 over an air interface 20. The vocoders 15–16 may be any digital signal processor (DSP) (e.g., a DSP68000 available from Motorola, Inc.) capable of voice coding and of determining a VAF based upon the number of frames of voice information coded per time period.

Upon receipt of an access request from a subscriber 21 by a transceiver 12–14 the request is forwarded to a base site controller 11 for validation of an ID of the subscriber 21 contained within the access request and a determination of channel availability. Also contained within the access request is an ID number of a communication target located within a service coverage area of the same or another base site 10 or within the public switched telephone network (PSTN)

Upon validation of the ID of the subscriber 21 and determination of channel availability, the controller 11 may transmit a call request through a PSTN interconnect (for a PSTN target) requesting access to the target. The controller 11 causes an access grant to be transmitted to the subscriber 21 through a transceiver (e.g., 12) identifying an allocated channel for use during the communication transaction. The controller 11 also allocates a vocoder (e.g., 15) and a signal path within the switch 17 between transceiver 12 and vocoder 15. Upon receipt of the access grant by the subscriber 21, the subscriber 21 and transceiver 12 tune to the allocated channel and the communication transaction between subscriber 21 and target (within the PSTN) may begin on the trunked physical channel comprising the allocated radio channel 20, transceiver 12, switch 17, and vocoder 15.

Under one embodiment of the invention, allocation of resources within the base site 10 is limited to periods when information is available for exchange between the subscriber 21 and target. Limitation of the allocation of resources to periods when information is available for exchange allows a portion (or all) of a trunked physical channel to be re-assigned to other users. During speech pauses some communication resources (e.g., transceivers) of the physical channel may be used by other time divided users of that part of the physical channel while other parts of the physical channel remain dedicated to the prior user.

Key to the successful re-allocation of communication resources at the base site 10 is a determination of a VAF of each user and the use of the VAF in setting a maximum number of users of communication resources within the base site 10. Where an average VAF of users within a system is low and the number of users large, the statistical probability of clipping as a result of additional users, in excess of the number of physical channels available, is low.

Figure 2:
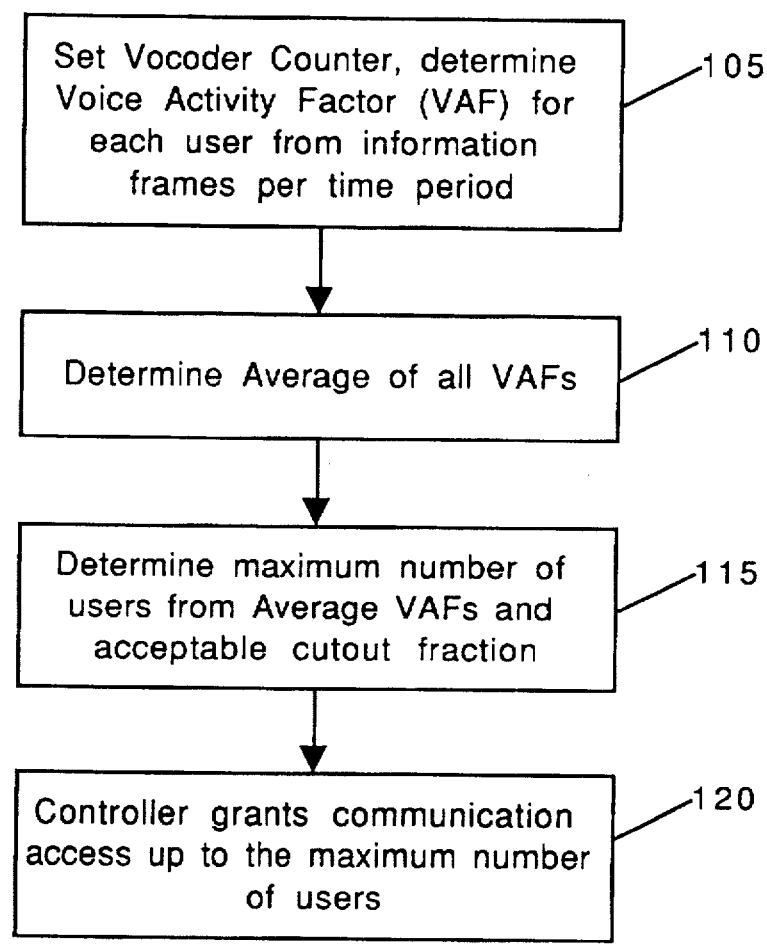
FIG. 2 is a flow chart illustrating a method for determining a maximum number of users in accordance with an embodiment of the invention.

As a means of describing the invention, operation of a base site 10 constructed with a lesser number of transceivers 12–14 than vocoders 15–16 will be described with further reference to FIG. 2. During pauses, transceivers 13–14 are released to other users. Other communication resources (e.g., vocoders 15–16) remain dedicated to a particular user. The reader is reminded, on the other hand, that the invention may be extended to any communication resource or combination of communication resources (e.g., vocoders, radio channels, etc.) available through the base site 10.

In the above described communication transaction, following call set-up, the controller constantly determines a VAF for each subscriber 21 granted access through the base site 10. The VAF may be determined by setting a counter within the vocoder to record the number of frames of information per time period coded for a particular user (Step 105).

An average VAF is then determined for all users of the base site 10 for use in setting a maximum number of users allowed access through the base site 10 (Step 110). The maximum number of users at the base site is then determined by evaluating the cutout fraction for a various number of users (n), and determining the largest n that has and acceptable cutout fraction (Step 115).

In one embodiment of the invention the maximum number of users is determined based on the Weinstein equation (above). For the case where a base station has 30 voice circuits and an average VAF of 0.50, a maximum number of allowable users, while still maintaining a clipping level of less than 0.5%, is 50 users.

Upon determination of a maximum number of users, the controller 11 continues to grant communication access up to the maximum calculated. When the number of users reaches the maximum calculated number the controller 11 refuses new requests. Where the maximum number of users decreases because of a change in average VAF then the controller either drops calls or reduces the number of users by attrition (Step 120).

Setting a maximum number of users within a cellular communication system by calculating an average VAF allows for maximum utilization of cellular equipment while optimizing voice quality. Such a procedure allows for a changing composition of users within the cellular system without compromising efficiency or performance.

In another embodiment of the invention a base site 10 is constructed with an equal number of vocoders and transceivers. Under such an embodiment, both vocoders, transceivers, and radio channels are released to other users. When speech is to begin from a subscriber 21, the subscriber unit transmits an access request on a control channel identifying the appropriate on-going communication transaction. The controller 11 upon receipt of the request allocates a transceiver, vocoder, and radio channel in support of the transmission. Upon completion of the transmission the resources are again released. Upon receipt of information from a PSTN subscriber the controller 11 causes a transceiver to transmit notification to the subscriber 21, notifying the subscriber of the need to tune to a newly allocated channel for receipt of the information.

As above a VAF is calculated for each user operating through the base site 10. A maximum number of users is determined based upon the number of resources and the VAF, using the Weinstein equation.

The many features and advantages of this invention are apparent from the detailed specification and thus it is intended by the appended claims to cover all such features and advantages of the system which fall within the true spirit and scope of the invention. Further, since numerous modifications and changes will readily occur to those skilled in the art (such as application of the invention to T1 lines), it is not desired to limit the invention to the exact construction and operation illustrated and described, and accordingly all suitable modifications and equivalents may be resorted to, falling within the scope of the invention.

It is, of course, to be understood that the present invention is, by no means, limited to the specific showing in the drawing, but also comprises any modification within the scope of the appended claims.

I claim:

1. In a resource limited cellular communication system having a physical channel shared by a plurality of users, a method of dynamically adjusting a maximum number of users allowed access to the physical channel comprising the steps of:

periodically determining a voice activity factor for each traffic channel user of the physical channel based, at least in part, upon a predetermined measure of vocoder activity for each said traffic channel user; and dynamically setting a maximum number of users for the physical channel based upon the determined voice activity factors.

2. The method of claim 1 wherein the step of adjusting the maximum number of users further includes determining an average of the determined voice activity factors.

3. The method as in claim 1 further including the step of granting access to the trunked physical channel to a time divided user when the plurality of time divided users does not exceed the maximum number of users and denying access when the plurality of users exceeds the maximum number of users.

4. In a resource limited communication system having at least one physical channel shared by a plurality of time divided users, an apparatus for dynamically adjusting a maximum number of users allowed access to the at least one physical channel comprising:

means for periodically calculating a voice activity factor for each traffic channel user of the plurality of time divided users; and means for dynamically adjusting the maximum number of users based upon the determined voice activity factors.

5. The apparatus of claim 4 wherein the means for adjusting the maximum number of users further comprises means for determining an average of the determined voice activity factors.

6. The apparatus as in claim 4 further comprising means for granting access to the trunked physical channel to a time divided user when the plurality of time divided users does not exceed the maximum number of users and denying access when the plurality of users exceeds the maximum number of users.

7. A method of allocating communication channels to a plurality of users within a resource limited communication system having at least one trunked physical channel, such method comprising the steps of:

periodically determining a voice activity factor, based upon a predetermined measure of vocoder activity, for each user operating on the at least one physical channel of the plurality of users within the communication system;

determining a maximum number of users to be allowed on the at least one physical channel based upon the periodically determined voice activity factors; and when the number of the users operating on the at least one physical channel exceeds the determined maximum number of users, denying access to a further user of the plurality of users requesting access to the physical channel.

8. The method as in claim 7 further including the step of granting access to a further user of the plurality of users when the number of users operating on the at least one physical channel does not exceed the calculated maximum number of users.

9. The method as in claim 7 wherein the step of determining a maximum number of users of the at least one physical channel based upon the determined voice activity factors further includes the step of averaging the determined voice activity factors.

10. An apparatus for allocating communication channels to a plurality of users within a resource limited trunked communication system having at least one trunked physical channel, such apparatus comprising:

means for periodically determining a voice activity factor, based upon a predetermined measure of vocoder activity, of each user of a number of users operating on the at least one physical channel of the plurality of users within the communication system;

means for determining a maximum number of users to be allowed on the at least one physical channel based upon the periodically determined voice activity factors; and means for denying access to a further user requesting access to the physical channel when the number of the users operating on the at least one physical channel exceeds the determined maximum number of users.

11. The apparatus as in claim 10 further comprising means for granting access to a further user of the plurality of users when the number of users operating on the at least one physical channel does not exceed the determined maximum number of users.

12. The apparatus as in claim 10 wherein the means for determining a maximum number of users of the at least one physical channel based upon the determined voice activity factors further comprises means for averaging the determined voice activity factors.

13. In a cellular communication system a method of allocating communication channels to a plurality of communication units within the cellular communication system on at least one physical channel, such method comprising the steps of:

periodically determining a voice activity factor of each communication unit of a number of communication units operating on the at least one physical channel;

determining a maximum number of communication units to be allowed on the at least one physical channel based upon the periodically determined voice activity factors; and when the number of the communication units operating on the at least one physical channel exceeds the determined maximum number of communication units, denying access to a further communication unit requesting access to the physical channel.

14. The method as in claim 13 further including the step of granting access to a further communication unit of the plurality of communication units when the number of communication units operating on the at least one physical channel does not exceed the determined maximum number of communication units.

15. The method as in claim 13 wherein the step of determining a maximum number of communication units of the at least one physical channel based upon the determined voice activity factors further includes the step of averaging the determined voice activity factors.

16. In a cellular communication system an apparatus for allocating communication channels to a plurality of communication units within the cellular communication system on at least one physical channel, such apparatus comprising:

means for determining a voice activity factor of each communication unit of a number of communication units operating on the at least one physical channel;

means for determining a maximum number of communication units to be allowed on the at least one physical channel based upon the periodically determined voice activity factors; and means for denying access to a further communication unit requesting access to the physical channel when the number of the communication units operating on the at least one physical channel exceeds the determined maximum number of communication units.

17. The apparatus as in claim 16 further comprising means for granting access to a communication unit of the plurality of communication units when the number of communication units operating on the at least one physical channel does not exceed the determined maximum number of communication units.

18. The apparatus as in claim 16 wherein the means for determining a maximum number of communication units of the at least one physical channel based upon the determined voice activity factors further comprises means for averaging the determined voice activity factors.

* * * * *